United States Patent
Higuchi et al.

(10) Patent No.: US 10,273,558 B2
(45) Date of Patent: Apr. 30, 2019

(54) ORE SLURRY PRE-TREATMENT METHOD AND ORE SLURRY MANUFACTURING METHOD

(71) Applicant: SUMITOMO METAL MINING CO., LTD., Tokyo (JP)

(72) Inventors: Hirotaka Higuchi, Tokyo (JP); Go Ohara, Tokyo (JP); Osamu Nakai, Tokyo (JP); Masaki Imamura, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 134 days.

(21) Appl. No.: 15/552,013

(22) PCT Filed: Dec. 1, 2015

(86) PCT No.: PCT/JP2015/083790
§ 371 (c)(1),
(2) Date: Aug. 18, 2017

(87) PCT Pub. No.: WO2016/136069
PCT Pub. Date: Sep. 1, 2016

(65) Prior Publication Data
US 2018/0037971 A1    Feb. 8, 2018

(30) Foreign Application Priority Data

Feb. 25, 2015 (JP) ................. 2015-035245

(51) Int. Cl.
| | |
|---|---|
| *C22B 1/00* | (2006.01) |
| *C22B 3/00* | (2006.01) |
| *C22B 3/08* | (2006.01) |
| *C22B 23/00* | (2006.01) |

(52) U.S. Cl.
CPC ............... *C22B 1/00* (2013.01); *C22B 3/08* (2013.01); *C22B 23/005* (2013.01); *C22B 23/043* (2013.01); *C22B 23/0415* (2013.01); *C22B 23/0453* (2013.01)

(58) Field of Classification Search
CPC ..... C22B 1/00; C22B 23/005; C22B 23/0415; C22B 23/043; C22B 23/0453; C22B 3/08
See application file for complete search history.

(56) References Cited

U.S. PATENT DOCUMENTS

| | | | |
|---|---|---|---|
| 4,044,096 | A | 8/1977 | Queneau et al. |
| 6,053,327 | A | 4/2000 | Cardini et al. |
| 7,563,421 | B2 | 7/2009 | Kobayashi et al. |
| 9,783,869 | B2 | 10/2017 | Hattori et al. |
| 2005/0265910 | A1 | 12/2005 | Kobayashi et al. |
| 2015/0284820 | A1 | 10/2015 | Hattori et al. |

FOREIGN PATENT DOCUMENTS

| | | |
|---|---|---|
| CA | 2678724 A1 | 3/2010 |
| EP | 1777304 A1 | 4/2007 |
| EP | 2775003 A1 | 9/2014 |
| EP | 2837701 A1 | 2/2015 |
| JP | 2005-350766 A | 12/2005 |
| JP | 2010-095788 A | 4/2010 |
| JP | 2012-107289 A | 6/2012 |
| WO | 2005/116281 A1 | 12/2005 |
| WO | 2014/125558 A1 | 8/2014 |

OTHER PUBLICATIONS

Extended European Search Report dated Dec. 1, 2017, issued to EP Patent Application No. 15883359.0.
Office Action dated Oct. 10, 2018, issued to CN Patent Application No. 201580076803.8.
Office Action dated Oct. 12, 2017, issued to CA Patent Application No. 2,977,602.
Examination Report dated Nov. 3, 2017, issued to AU Patent Application No. 2015384742.
Notice of Reasons for Rejection dated Mar. 15, 2016, issued to JP Application No. 2015-035245 and English translation thereof.
International Search Report dated Jan. 12, 2016, issued for PCT/JP2015/083790.

*Primary Examiner* — Jenny R Wu
(74) *Attorney, Agent, or Firm* — Locke Lord LLP

(57) ABSTRACT

Provided is a hydrometallurgical process for nickel oxide ore effectively reducing the amount of sulfuric acid used in the leaching step and the amount of a neutralizer such as slaked lime used in the final neutralization step without reducing nickel yield. The present invention is a method for pre-treating ore slurry to be submitted for leaching treatment in a hydrometallurgical process for nickel oxide ore, the method comprising: a separating step for separating the ore slurry into a coarse particle fraction, in which particles having a particle diameter of less than 45 µm are 30 mass % of the solids or less, and a fine particle fraction, and feeding said fine particle fraction to the leaching process; and a vibration sieving step for separating the separated coarse particle fraction into oversize particles and undersize particles using vibration sieving and feeding the ore slurry of said undersize particles to the leaching process.

5 Claims, 1 Drawing Sheet

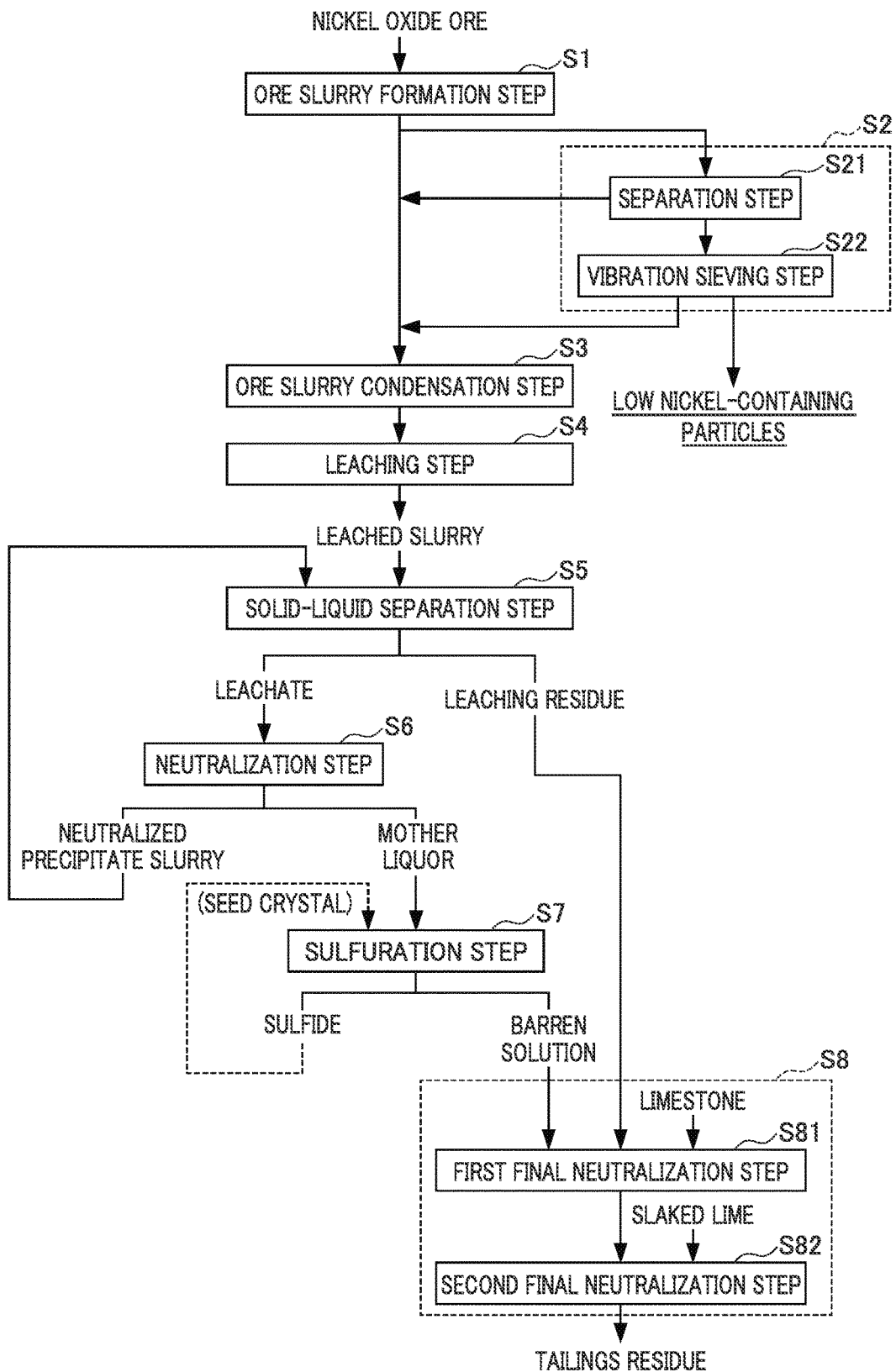

ORE SLURRY PRE-TREATMENT METHOD AND ORE SLURRY MANUFACTURING METHOD

TECHNICAL FIELD

The present invention relates to a method for pre-treating ore slurry, and more particularly to a method for pre-treating ore slurry to be provided to a leaching treatment in a hydrometallurgical process for nickel oxide ore and a method for manufacturing ore slurry to be provided to the leaching treatment.

BACKGROUND ART

In recent years, a high pressure acid leaching method using sulfuric acid has been gathering attention as a hydrometallurgical process for nickel oxide ore. This method is different from a dry smelting method that is a general smelting method for a nickel oxide ore of the related art and includes a continuous wet step without including dry steps such as reducing and drying steps. Thus, the method is advantageous in regard to energy and cost. In addition, the method is also advantageous in that it is possible to obtain a sulfide containing nickel (hereinafter, also referred to as "nickel sulfide"), whose nickel grade is improved to about 50% by mass (hereinafter, "% by mass" is simply referred to as "%"). The nickel sulfide is precipitated and generated through processes in which, after washing a leachate obtained by leaching the nickel oxide ore, by blowing a hydrogen sulfide gas thereto, a sulfuration reaction is caused to occur (a sulfuration step).

In a step for leaching metal from the nickel oxide ore by such a high temperature pressure acid leaching method (hereinafter, also simply referred to as "leaching step"), since impurity elements such as iron, magnesium, manganese, and aluminum are leached by sulfuric acid in addition to nickel and cobalt as recovery targets, an excessive amount of sulfuric acid is necessary for the treatment.

Further, in the sulfuration step for recovering nickel and cobalt, nickel and cobalt are selectively recovered as sulfides, but most of the impurity elements such as iron, magnesium, manganese, and aluminum leached by the leaching treatment in a leaching step do not form sulfides and remain in a barren solution obtained after sulfides are separated. In order to discharge this barren solution, it is necessary in a final neutralization step that metal ions remaining in the barren solution are precipitated and removed by a neutralization treatment.

Herein, in the final neutralization step, a method is generally performed in which the pH of the barren solution is increased to about 5 by adding a limestone slurry to the barren solution obtained through the sulfuration step so as to remove iron and aluminum and then the pH is increased to about 9 by adding a slaked lime slurry thereto so as to remove magnesium and manganese. Therefore, since the necessary amount (added amount) of the slaked lime slurry is determined depending on the amounts of magnesium ions and manganese ions remaining in the barren solution, a large amount of slaked lime slurry is needed in a case where the content of magnesium and the content of manganese in the nickel oxide ore are large.

Patent Document 1 discloses a technique of providing a simple and highly efficient smelting method as the entire process by simplification of a leaching step and a solid-liquid separation step, reducing the amount of neutralizer consumed in a neutralization step and the amount of a precipitate, an efficient method of repeatedly using water, and the like in a hydrometallurgical process for recovering nickel from a nickel oxide ore on the basis of high temperature pressure leaching. However, Patent Document 1 does not disclose the technical idea for reducing the amount of sulfuric acid used in the leaching treatment in the leaching step or reducing the amount of slaked lime used in the aforementioned final neutralization step.

Patent Document 1: Japanese Unexamined Patent Application, Publication No. 2005-350766

DISCLOSURE OF THE INVENTION

Problems to be Solved by the Invention

The present invention is proposed in view of the circumstances as described above, and an object thereof is to provide a method capable of effectively reducing the amount of sulfuric acid used in a leaching step and the amount of neutralizer such as slaked lime used in a final neutralization step in a hydrometallurgical process for nickel oxide ore without reducing nickel yield.

Means for Solving the Problems

The present inventors have conducted intensive studies to solve the aforementioned problems. As a result, the present inventors have found that by carrying out a specific pre-treatment on ore slurry to be provided to a leaching treatment in a leaching step of a hydrometallurgical process for nickel oxide ore, the amount of agents such as sulfuric acid and slaked lime used in a smelting process can be reduced without reducing nickel yield, and thus the present invention has been completed. That is, the present invention provides the following.

(1) A first invention of the present invention is a method for pre-treating ore slurry to be provided to a leaching treatment in a hydrometallurgical process for nickel oxide ore, the method including: a separation step for separating ore slurry into a coarse particle fraction in which particles having a particle diameter of less than 45 μm are 30% by mass or less in a solid content and a fine particle fraction and supplying the fine particle fraction to the leaching treatment; and a vibration sieving step for separating, by a vibration sieve, the separated coarse particle fraction into a fraction on the sieve and a fraction under the sieve and supplying the fraction under the sieve as ore slurry to the leaching treatment.

(2) A second invention of the present invention is the method for pre-treating ore slurry in the first invention, in which a mesh size of the vibration sieve is 300 μm or more.

(3) A third invention of the present invention is the method for pre-treating ore slurry in the first or second invention, in which any one or more of a hydrocyclone and a density separator are used in the separation step.

(4) A fourth invention of the present invention is the method for pre-treating ore slurry in any one of the first to third inventions, in which the separation step includes a classification and separation step for supplying the ore slurry to a hydrocyclone and subjecting the ore slurry to classification and separation, and a specific gravity separation step for supplying an underflow classified by the hydrocyclone in the classification and separation step to a density separator and subjecting the underflow to specific gravity separation.

(5) A fifth invention of the present invention is the method for pre-treating ore slurry in any one of the first to fourth inventions, in which the hydrometallurgical process for nickel oxide ore includes ore slurry formation step for forming slurry of the nickel oxide ore (ore slurry), a leaching step for carrying out a leaching treatment on the ore slurry under high temperature and high pressure by adding sulfuric acid, a solid-liquid separation step for separating a residue while the obtained leached slurry is washed in multiple stages, to obtain a leachate containing nickel and impurity elements, a neutralization step for separating a neutralized precipitate containing the impurity elements by adjusting a pH of the leachate to obtain a post-neutralization solution containing nickel, a sulfuration step for carrying out a sulfuration treatment on the post-neutralization solution to generate a sulfide containing nickel and a barren solution, and a final neutralization step for recovering and detoxifying the barren solution discharged in the sulfuration step.

(6) A sixth invention of the present invention is a method for manufacturing ore slurry to be provided to a leaching treatment in a hydrometallurgical process for nickel oxide ore, the method including: ore slurry formation step for obtaining a coarse ore slurry from the nickel oxide ore; a separation step for separating the coarse ore slurry into a coarse particle fraction in which particles having a particle diameter of less than 45 µm are 30% by mass or less in a solid content and a fine particle fraction; a vibration sieving step for separating, by a vibration sieve, the separated coarse particle fraction into a fraction on the sieve and a fraction under the sieve; and ore slurry condensation step for loading the ore slurry of the fine particle fraction separated in the separation step and the ore slurry of the fraction under the sieve separated in the vibration sieving step into a solid-liquid separation device and separating and removing moisture contained in the ore slurry to condense ore components.

Effects of the Invention

According to the present invention, it is possible to effectively reduce the amount of sulfuric acid used in the leaching step and the amount of a neutralizer such as slaked lime used in the final neutralization step in the hydrometallurgical process for nickel oxide ore without reducing nickel yield.

BRIEF DESCRIPTION OF THE DRAWINGS

FIG. 1 is a process diagram illustrating an example of the flow of a hydrometallurgical process for nickel oxide ore.

PREFERRED MODE FOR CARRYING OUT THE INVENTION

Hereinafter, a specific embodiment of the present invention (hereinafter, referred to as "the present embodiment") will be described in detail. Incidentally, the present invention is not limited to the following embodiment, and various modifications can be made within the range that does not change the spirit of the present invention.

«1. Method for Pre-Treating Ore Slurry»

The method for pre-treating ore slurry according to the present embodiment is a method for pre-treating slurry of a nickel oxide ore to be provided to a leaching treatment, for example, by high temperature high pressure acid leaching in a hydrometallurgical process for nickel oxide ore. Specifically, the method includes: a separation step for separating ore slurry of a nickel oxide ore into a coarse particle fraction in which particles having a particle diameter of less than 45 µm are 30% by mass or less in a solid content and a fine particle fraction and supplying the fine particle fraction to the leaching treatment; and a vibration sieving step for separating, by a vibration sieve, the separated coarse particle fraction into a fraction on the sieve and a fraction under the sieve and supplying the ore slurry of the fraction under the sieve to the leaching treatment.

Herein, it is known that in the hydrometallurgical process for nickel oxide ore, the amount of sulfuric acid used in the leaching treatment of a leaching step and the amount of a neutralizer such as slaked lime used in a neutralization treatment of a final neutralization step are increased by the presence of elements such as iron, magnesium, manganese, and aluminum which are metal elements other than nickel and cobalt contained in the nickel oxide ore serving as a raw material ore. Such metal elements are mixed, mainly as gangue components, in the slurry of the nickel oxide ore (ore slurry) to be provided to the leaching treatment. The present inventors found that the gangue components exist as coarse particles in the ore slurry, for example, coarse particles having a particle diameter of 45 µm or more.

In this regard, low nickel-containing particles in the ore slurry to be provided to the leaching treatment in the leaching step, that is, coarse particle ore is separated and further subjected to a pre-treatment to remove the coarse particle ore by a vibration sieve. Therefore, the amount of sulfuric acid used in the leaching step and the amount of slaked lime used in the final neutralization step can be effectively reduced.

<1-1. Separation Step>

In the separation step, the ore slurry of the nickel oxide ore is separated into a "coarse particle fraction" in which particles having a particle diameter of less than 45 µm are 30% by mass or less in a solid content and a "fine particle fraction." The fine particle fraction obtained by separation becomes ore slurry to be supplied to the leaching treatment without any change.

In the separation step, by using a classification and separation facility or a specific gravity separation facility and determining the operation condition thereof, it is possible to separate the ore slurry into a coarse particle fraction in which the percentage of particles having a particle diameter of less than 45 µm in the ore slurry is 30% by mass or less and a fine particle fraction.

Herein, when the percentage of particles having a particle diameter of less than 45 µm of the coarse particle fraction in the ore slurry to be provided to the vibration sieving step of the subsequent step to be described later is more than 30% by mass, the particles having a particle diameter of less than 45 µm adhere to the low nickel-containing coarse particles and thus the particles having a particle diameter of less than 45 µm are removed, together with the low nickel-containing particles, on the vibration sieve. On the other hand, although the percentage of particles having a particle diameter of less than 45 µm of the coarse particle fraction in the ore slurry to be supplied to the vibration sieve is desirably near 0%, when the percentage of particles having a particle diameter of less than 45 µm is decreased, the low nickel-containing coarse particles are mixed with the fine particle fraction separated from the coarse particle fraction. For example, when the percentage of particles having a particle diameter of less than 45 µm is less than 10% by mass, the low nickel-containing coarse particles start to be mixed with the fine particle fraction.

In the separation treatment in the separation step, it is preferable to perform the separation treatment using any one or more of a hydrocyclone and a density separator. In the separation treatment using a hydrocyclone or a density separator, the ore slurry can be separated into an underflow and an overflow with high accuracy on the basis of the particle size, which is preferable.

In addition, this separation step more preferably includes a classification and separation step for supplying the ore slurry to a hydrocyclone and subjecting the ore slurry to classification and separation and a specific gravity separation step for supplying an underflow classified by the hydrocyclone in the classification and separation step to a density separator and subjecting the underflow to specific gravity separation.

That is, the amount of the nickel oxide ore (ore slurry) to be treated in the hydrometallurgical process is large, and the particles of the ore slurry are, for example, fine particles in which 80% to 95% of the particles have a particle diameter of less than 45 µm. For this reason, it is preferable to first carry out a classification and separation treatment using a hydrocyclone that is suitable for treating a large amount of the ore slurry and suitable for treating the fine particle fraction, that is, treatment in a case where distribution to the overflow is large.

Subsequently, it is preferable to carry out a specific gravity separation treatment using a density separator that is suitable for treatment in a case where the treated amount is relatively small and the distribution ratios of the underflow and the overflow are almost the same, to the ore slurry whose amount to be treated is largely reduced.

In this way, by performing the separation treatment by the classification and separation treatment using a hydrocyclone and the specific gravity separation treatment using a density separator in the separation step, coarse particles containing gangue components in the ore slurry, that is, low nickel-containing particles can be efficiently separated and removed.

<1-2. Vibration Sieving Step>

Next, the ore slurry of the coarse particle fraction which is separated in the separation step and in which particles having a particle diameter of less than 45 µm are 30% by mass or less in a solid content is separated, by using a vibration sieve, into a fraction on the sieve and a fraction under the sieve and the ore slurry of the fraction under the sieve is supplied to the leaching treatment in the leaching step. In this way, by carrying out the treatment by the vibration sieve, the ore particles having a low nickel grade are separated and the ore particles can be dehydrated. Thus, a dehydration step or the like is not separately provided and the ore particles can be deposited without any change.

The mesh size of the vibration sieve to be used in a vibration sieving treatment is not particularly limited, but is desirably set to about 300 µm to 500 µm. When the mesh size of the vibration sieve is less than 300 µm, the percentage of ore particles remaining on the sieve is increased, and in accordance with this increase, fine particles having a high nickel content which adhere to the ore particles and remain on the sieve may be increased. On the other hand, when the mesh size of the vibration sieve is more than 500 µm, the ore particles having a low nickel grade are mixed with the fraction under the sieve in some cases.

As described above, the method for pre-treating ore slurry according to the present embodiment includes a separation step for separating ore slurry to be provided to a leaching treatment in a hydrometallurgical process for nickel oxide ore into a coarse particle fraction in which particles having a particle diameter of less than 45 µm are 30% by mass or less in a solid content and a fine particle fraction and a vibration sieving step for performing a sieving treatment on the separated coarse particle fraction by a vibration sieve. According to this, in the fraction on the vibration sieve obtained through the vibration sieving step, gangue components such as iron, magnesium, manganese, and aluminum can be efficiently separated. Then, by supplying other separated components, that is, the fine particle fraction separated in the separation step and the component of the fraction under the vibration sieve as the ore slurry to the leaching treatment, the amount of sulfuric acid used in the leaching step and the amount of a neutralizer such as slaked lime used in the final neutralization step in the hydrometallurgical process can be effectively reduced.

Hereinafter, the hydrometallurgical process for nickel oxide ore to which the method for pre-treating ore slurry is applied will be described in detail.

«2. Regarding Hydrometallurgical Process for Nickel Oxide Ore»

The hydrometallurgical process for nickel oxide ore is, for example, a smelting process for leaching nickel to recover nickel from the nickel oxide ore by using a high pressure acid leaching method (HPAL method).

FIG. 1 is a process diagram illustrating an example of the flow of a hydrometallurgical process for nickel oxide ore by a high pressure acid leaching method. As illustrated in the process diagram of FIG. 1, the hydrometallurgical process for nickel oxide ore includes: ore slurry formation step S1 for forming the nickel oxide ore as slurry; ore slurry condensation step S3 for condensing ore components by removing moisture contained in the ore slurry; a leaching step S4 for preforming a leaching treatment under high temperature and high pressure by adding sulfuric acid to the produced ore slurry; a solid-liquid separation step S5 for separating a residue while the obtained leached slurry is washed in multiple stages to obtain a leachate containing nickel and impurity elements; a neutralization step S6 for separating a neutralized precipitate containing impurity elements by adjusting the pH of the leachate to obtain a post-neutralization solution containing nickel; and a sulfuration step S7 for generating a sulfide containing nickel (nickel sulfide) by adding a sulfurizing agent to the post-neutralization solution. Furthermore, this hydrometallurgical process includes a final neutralization step S8 for recovering and detoxifying the leaching residue separated in the solid-liquid separation step S5 and a barren solution discharged in the sulfuration step S7.

Further, in the present embodiment, it is characterized in that before carrying out the leaching treatment using sulfuric acid on the ore slurry, a pre-treatment step S2 for pre-treating the slurried ore is provided.

(1) Ore Slurry Formation Step

In the ore slurry formation step S1, the nickel oxide ore serving as a raw material ore is classified at a predetermined classifying point so that oversized ore particles are removed, and then water is added to undersized ore particles to obtain a coarse ore slurry.

Herein, the nickel oxide ore serving as a raw material ore is ore containing nickel and cobalt, and a so-called laterite ore such as a limonite ore and a saprolite ore is mainly used. The content of nickel in the laterite ore is typically 0.8% by weight to 2.5% by weight and nickel is contained as hydroxide or silica-magnesia (magnesium silicate) mineral. Further, the content of iron is 10% by weight to 50% by weight and iron is mainly in the form of trivalent hydroxide (goethite); however, some divalent iron is contained in silica-magnesia mineral. Further, in addition to such a laterite ore, an oxide ore containing valuable metals such as nickel, cobalt, manganese, and copper, for example, manganese nodules existing at the bottom of the deep part of the sea, or the like are used.

The method for classifying the nickel oxide ore is not particularly limited as long as it can classify ores on the basis of a desired particle diameter, and for example, the classification can be performed by sieve classification using a general grizzly sieve, a vibration sieve, or the like. Further, the classifying point is not particularly limited, and a classifying point for obtaining ore slurry composed of ore particles having a desired particle diameter value or less can be appropriately set.

(2) Pre-Treatment Step

In the present embodiment, before carrying out the leaching treatment on the ore slurry, the pre-treatment step S2 for pre-treating the ore slurry obtained through the ore slurry formation step is provided.

The pre-treatment step S2 includes a separation step S21 for separating the ore slurry obtained through the ore slurry formation step S1 into a coarse particle fraction in which particles having a particle diameter of less than 45 µm are 30% by mass or less in a solid content and a fine particle fraction and then supplying the fine particle fraction to the leaching treatment in the leaching step S4 described later and a vibration sieving step S22 for separating, by a vibration sieve, the separated coarse particle fraction into a fraction on the sieve and a fraction under the sieve and then supplying the ore slurry of the fraction under the sieve to the leaching treatment in the leaching step S4.

A detailed description of the pre-treatment in the pre-treatment step S2 is not provided herein since the pre-treatment is the same as described above, but by carrying out the pre-treatment on the ore slurry in this way, it is possible to separate gangue components such as iron, magnesium, manganese, and aluminum from the ore slurry and to effectively reduce the amount of sulfuric acid used in the leaching step and the amount of a neutralizer such as slaked lime used in the final neutralization step without reducing nickel yield.

The ore slurry containing the fine particle fraction separated in the separation step S21 in the pre-treatment step S2 and the ore slurry classified into the fraction under the sieve in the vibration sieving step S22 are supplied to the leaching treatment in the leaching step S4 through the ore slurry condensation step S3 described below.

(3) Ore Slurry Condensation Step

In the ore slurry condensation step S3, the ore slurry containing the fine particle fraction separated in the separation step S21 in the aforementioned pre-treatment step S2 and the ore slurry containing ore particles of the fraction under the sieve separated in the vibration sieving step S22 are loaded into a solid-liquid separation device and moisture contained in the coarse ore slurry is separated and removed to condense ore components, thereby obtaining the ore slurry.

Specifically, in the ore slurry condensation step S3, each ore slurry is loaded, for example, into a solid-liquid separation device such as a thickener, and the solid components are precipitated and extracted from the lower portion of the device, while moisture forming a supernatant is overflowed from the upper portion of the device; thus, solid-liquid separation is carried out. Through this solid-liquid separation treatment, the moisture in the ore slurry is reduced, and the ore components in the slurry are condensed so that ore slurry having, for example, a solid concentration of about 40% by weight is obtained.

Incidentally, as described above, by undergoing the ore slurry formation step S1, the pre-treatment step S2 including the separation step S21 and the vibration sieving step S22, and the ore slurry condensation step S3, it is possible to manufacture ore slurry to be provided to the leaching treatment in the leaching step S4 described below and the method including these steps can be defined as a method for manufacturing ore slurry.

(4) Leaching Step

In the leaching step S4, the leaching treatment, for example, using a high pressure acid leaching method is carried out on the produced ore slurry. Specifically, sulfuric acid is added to the ore slurry containing the nickel oxide ore serving as raw material and the ore slurry is stirred while being pressurized under a high temperature condition of 220° C. to 280° C., thereby generating a leached slurry composed of a leachate and a leaching residue.

In the leaching treatment in the leaching step S4, a leaching reaction represented by the following formulae (i) to (iii) and a high temperature thermal hydrolysis reaction represented by the following formulae (iv) and (v) occur so that leaching of nickel, cobalt, and the like as sulfates and fixation of the leached iron sulfate as hematite are performed.

Leaching Reaction

(incidentally, M in the formula represents Ni, Co, Fe, Zn, Cu, Mg, Cr, Mn, or the like)

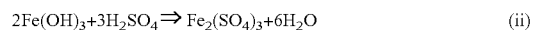

High Temperature Thermal Hydrolysis Reaction

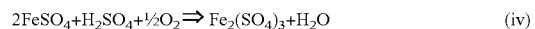

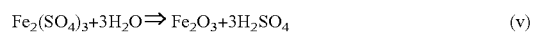

Herein, conventionally, an excessive amount is generally used as the amount of sulfuric acid added in the leaching step S4. Since impurities such as iron, magnesium, manganese, and aluminum are contained in the nickel oxide ore in addition to nickel and cobalt and these impurities are also leached by sulfuric acid, in order to increase a yield of a recovery target such as nickel or cobalt, the leaching treatment is performed by adding an excessive amount of sulfuric acid. On the other hand, in the present embodiment, a specific pre-treatment is carried out in the aforementioned pre-treatment step S2 on the ore slurry to be provided to the leaching treatment in the leaching step S4 so that the concentration of impurities contained in the ore slurry can be decreased, and the added amount of sulfuric acid used in the leaching treatment can be effectively reduced.

(5) Solid-Liquid Separation Step

In the solid-liquid separation step S5, the leached slurry is separated into a leachate containing impurity elements in addition to nickel and cobalt and a leaching residue while the leached slurry obtained through the leaching step S4 is washed in multiple stages.

In the solid-liquid separation step S5, for example, the leached slurry is mixed with a rinsing liquid and then subjected to the solid-liquid separation treatment by a solid-liquid separation facility such as a thickener. Specifically, first, the leached slurry is diluted with the rinsing liquid, and then the leaching residue in the slurry is condensed as a precipitate in the thickener. According to this, the remaining nickel adhered to the leaching residue can be decreased depending on the degree of dilution. Incidentally, the solid-liquid separation treatment may be performed, for example, by adding an anionic flocculant.

In the solid-liquid separation step S5, it is preferable that the solid-liquid separation be carried out while the leached slurry is washed in multiple stages. As a multiple washing method, for example, a continuous countercurrent multi-stage washing method in which the leached slurry is brought into countercurrent contact with a rinsing liquid can be used. According to this, the rinsing liquid to be newly introduced into the system can be reduced and the recovery rate of nickel and cobalt can be improved to 95% or more. In addition, the rinsing liquid (rinsing water) is not particularly limited, but it is preferable to use a liquid which contains no nickel and has no effect on the step. For example, as the rinsing liquid, preferably, a barren solution to be obtained in the sulfuration step S7 of the subsequent steps can be repeatedly used.

(6) Neutralization Step

In the neutralization step S6, the pH of the leachate separated in the solid-liquid separation step S5 is adjusted and a neutralized precipitate containing impurity elements is separated to thereby obtain a post-neutralization solution containing nickel and cobalt.

Specifically, in the neutralization step S6, a neutralizer such as calcium carbonate is added to the leachate while the oxidation of the separated leachate is suppressed such that the pH of the post-neutralization solution to be obtained is adjusted to 4 or less, preferably to 3.0 to 3.5, and more preferably to 3.1 to 3.2, thereby generating a post-neutralization solution and a neutralized precipitate slurry containing trivalent iron, aluminum, and the like as impurity elements. In the neutralization step S6, the impurities are removed as the neutralized precipitate in this way and a post-neutralization solution serving as a mother liquor for recovering nickel is generated.

(7) Sulfuration Step

In the sulfuration step S7, a sulfurizing agent such as hydrogen sulfide gas is blown into the post-neutralization solution serving as a mother liquor for recovering nickel to cause a sulfuration reaction to occur, thereby generating a sulfide containing nickel (and cobalt) (hereinafter, also simply referred to as "nickel sulfide") and a barren solution.

The post-neutralization solution serving as a mother liquor for recovering nickel is a sulfuric acid solution in which the impurity components in the leachate are decreased through the neutralization step S6. Incidentally, there is a possibility that about several g/L of iron, magnesium, manganese, and the like are contained as impurity components in the mother liquor for recovering nickel, but these impurity components have low stability as a sulfide (as compared to nickel and cobalt to be recovered) and are not contained in the nickel sulfide to be generated.

The sulfuration treatment in the sulfuration step S7 is executed in a nickel recovery facility. The nickel recovery facility includes, for example, a sulfuration reaction tank in which a sulfuration reaction is performed by blowing hydrogen sulfide gas or the like into the post-neutralization solution serving as the mother liquor and a solid-liquid separation tank in which nickel sulfide is separated and recovered from the post-sulfuration reaction solution. The solid-liquid separation tank is configured, for example, by a thickener or the like, and the nickel sulfide that is a precipitate is separated and recovered from the bottom portion of the thickener by carrying out a sedimentation and separation treatment on the slurry containing nickel sulfide and obtained after the sulfuration reaction. Meanwhile, the aqueous solution components are overflowed and recovered as a barren solution. Incidentally, the recovered barren solution is a solution having an extremely low concentration of valuable metals such as nickel and contains impurity elements such as iron, magnesium, and manganese remaining without being sulfurized. This barren solution is transferred to the final neutralization step S8 described below and subjected to a detoxification treatment.

(8) Final Neutralization Step

In the final neutralization step S8, a neutralization treatment (a detoxification treatment) to adjust the pH to a predetermined pH range satisfying the discharge standard is carried out on the barren solution discharged in the aforementioned sulfuration step S7 which contains impurity elements such as iron, magnesium, and manganese. In this final neutralization step S8, it is possible to treat the leaching residue discharged from the solid-liquid separation treatment in the solid-liquid separation step S5 together with the barren solution.

A method for the detoxification treatment in the final neutralization step S8, that is, a method for adjusting the pH is not particularly limited, but for example, the pH can be adjusted to a predetermined range by adding a neutralizer such as a calcium carbonate (limestone) slurry or a calcium hydroxide (slaked lime) slurry.

In the final neutralization treatment in the final neutralization step S8, it is possible to perform a stepwise neutralization treatment including a neutralization treatment at the first stage (first final neutralization step S81) using limestone as a neutralizer and a neutralization treatment at the second stage (second final neutralization step S82) using slaked lime as a neutralizer. By performing the stepwise neutralization treatment in this way, the neutralization treatment can be performed efficiently and effectively.

Specifically, in the first final neutralization step S81, the barren solution discharged and recovered from the sulfuration step S7 and the leaching residue separated in the solid-liquid separation step S5 are loaded into a neutralization treatment tank and subjected to a stirring treatment by adding a limestone slurry. In this first final neutralization step S81, by adding the limestone slurry, the pH of a solution to be treated such as the barren solution is adjusted to 4 to 5.

Next, in the second final neutralization step S82, the stirring treatment is carried out on the solution subjected to the neutralization treatment at the first stage by adding a limestone slurry, by adding a slaked lime slurry. In this second final neutralization step S82, by adding the slaked lime slurry, the pH of the solution to be treated is increased to 8 to 9.

By performing such a two-stage neutralization treatment, a neutralization treatment residue is generated and stored in a tailings dam (a tailings residue). Meanwhile, a solution obtained after the neutralization treatment satisfies the discharge standard and is discharged to the outside of the system.

Herein, in the treatment in the final neutralization step, the amount of a neutralizer such as slaked lime is determined according to the amount of impurity element ions such as magnesium ions and manganese ions remaining in the barren solution. In the present embodiment, a specific pre-treatment is carried out in the aforementioned pre-treatment step S2 on the ore slurry to be provided to the leaching treatment in the leaching step S4 so that the impurity elements such as magnesium and manganese contained in the ore slurry can be reduced. According to this, it is possible to decrease the concentration of these elements contained in the barren solution and effectively reduce the amount of a neutralizer used in the neutralization treatment in the final neutralization step.

EXAMPLES

Hereinafter, the present invention will be described in more detail by means of Examples, but the present invention is not limited to the following Examples at all.

Example 1

A hydrometallurgical treatment for nickel oxide ore formed from the process diagram illustrated in FIG. 1 was performed in the following manner. That is, first, as a pre-treatment step for ore slurry, ore slurry obtained by slurrying a nickel oxide ore having a composition presented in the following Table 1 was supplied to a hydrocyclone (manufactured by Salter Cyclones Ltd., SC1030-P type) to be subjected to a classification and separation treatment and then the underflow discharged from the hydrocyclone was supplied to a density separator (manufactured by CFS Co., Ltd., 6×6 type) to be subjected to a specific gravity separation treatment. By these separation treatments, ore slurry (coarse particle fraction) in which the content of particles having a particle diameter of less than 45 μm in the underflow solid content of the density separator is 25% by mass was obtained.

TABLE 1

|  | Ni [%] | Mg [%] | Solid [t/h] | <45 μm [%] |
| --- | --- | --- | --- | --- |
| Nickel oxide ore | 0.91 | 1.59 | 60 | 89 |

Next, the obtained ore slurry was supplied at a solid concentration of 20% to a vibration sieve equipped with a sieve having a mesh size of 300 μm (manufactured by Sizetech, VDS27-6 type) to be subjected to a vibration sieving treatment. With this vibration sieve, solid contents having a nickel grade of 0.83% and a magnesium grade of 7.50%, that is, low nickel-containing particles were obtained as a fraction on the sieve. Meanwhile, the ore slurry of the fraction under the vibration sieve and the ore slurry of the fine particle fraction obtained in the aforementioned separation step were supplied to the leaching step in which the leaching treatment is carried out on the ore.

At this time, the nickel loss rate to the fraction on the vibration sieve was 6.7%. In addition, the amount of sulfuric acid consumed in the leaching treatment in the leaching step to which the ore slurry was supplied was 272 kg/ore tonne. Further, when the sulfuration treatment was carried out on the leachate obtained through the leaching treatment (the sulfuration step) and the final neutralization treatment was carried out on the barren solution obtained by the sulfuration treatment (the final neutralization step), the amount of slaked lime used in the neutralization treatment was 36 kg/ore tonne.

Example 2

By performing a similar operation to Example 1, ore slurry (coarse particle fraction) in which the content of particles having a particle diameter of less than 45 μm in the underflow solid content of the density separator is 30% by mass was obtained. Then, the obtained ore slurry was supplied at a solid concentration of 20% to a vibration sieve equipped with a sieve having a mesh size of 300 μm to be subjected to a vibration sieving treatment. With this vibration sieve, solid contents having a nickel grade of 0.84% and a magnesium grade of 7.39%, that is, low nickel-containing particles were obtained as a fraction on the sieve. Meanwhile, the ore slurry of the fraction under the vibration sieve and the ore slurry of the fine particle fraction obtained in the separation step were supplied to the leaching step in which the leaching treatment is carried out on the ore.

At this time, the nickel loss rate to the fraction on the vibration sieve was 6.8%. In addition, the amount of sulfuric acid consumed in the leaching treatment in the leaching step to which the ore slurry was supplied was 272 kg/ore tonne. Further, when the sulfuration treatment was carried out on the leachate obtained through the leaching treatment (the sulfuration step) and the final neutralization treatment was carried out on the barren solution obtained by the sulfuration treatment (the final neutralization step), the amount of slaked lime used in the neutralization treatment was 36 kg/ore tonne.

Comparative Example 1

By performing a similar operation to Example 1, ore slurry (coarse particle fraction) in which the content of particles having a particle diameter of less than 45 μm in the underflow solid content of the density separator is 35% by mass was obtained. Then, the obtained ore slurry was supplied at a solid concentration of 20% to a vibration sieve equipped with a sieve having a mesh size of 300 μm to be subjected to a vibration sieving treatment. With this vibration sieve, solid contents having a nickel grade of 0.84% and a magnesium grade of 6.95% were obtained as the fraction on the sieve. Meanwhile, the ore slurry of the fraction under the vibration sieve and the ore slurry of the fine particle fraction obtained in the separation step were supplied to the leaching step in which the leaching treatment is carried out on the ore.

At this time, the nickel loss rate to the fraction on the vibration sieve was 7.7% and was increased as compared to Examples 1 and 2. The reason for this is considered that since the content of particles having a particle diameter of less than 45 μm in the ore slurry supplied to the vibration sieve was large, the particles were removed on the sieve together with the low nickel-containing particles. Incidentally, the amount of sulfuric acid consumed in the leaching treatment in the leaching step to which the ore slurry was supplied was 271 kg/ore tonne. Further, when the sulfuration treatment was carried out on the leachate obtained through the leaching treatment (the sulfuration step) and the final neutralization treatment was carried out on the barren solution obtained by the sulfuration treatment (the final neutralization step), the amount of slaked lime used in the neutralization treatment was 35.5 kg/ore tonne.

As described above, in Comparative Example 1, the amount of sulfuric acid used in the leaching step and the amount of slaked lime used in the final neutralization step could be reduced, but the nickel yield was decreased.

Comparative Example 2

A nickel oxide ore having a composition presented in Table 1 was slurried and the ore slurry was supplied at a solid concentration of 20% to a vibration sieve equipped with a sieve having a mesh size of 300 μm to be subjected to the vibration sieving treatment, without carrying out the separation treatment (the specific gravity separation) on the ore slurry. The content of particles having a particle diameter of less than 45 μm in the solid content supplied at this time was 80%. With this vibration sieve, solid contents having a nickel grade of 0.88% and a magnesium grade of 3.95% were obtained as the fraction on the sieve. Meanwhile, the ore slurry of the fraction under the vibration sieve and the ore slurry of the fine particle fraction obtained in the separation step were supplied to the leaching step in which the leaching treatment is carried out on the ore.

At this time, the nickel loss rate to the fraction on the vibration sieve was 16.9%, which was extremely large. The reason for this is considered, similarly to Comparative Example 2, that the content of particles having a particle diameter of less than 45 μm in the ore slurry supplied to the vibration sieve was extremely large. Incidentally, the amount of sulfuric acid consumed in the leaching treatment in the leaching step to which the ore slurry was supplied was 270 kg/ore tonne. Further, when the sulfuration treatment was carried out on the leachate obtained through the leaching treatment (the sulfuration step) and the final neutralization treatment was carried out on the barren solution obtained by the sulfuration treatment (the final neutralization step), the amount of slaked lime used in the neutralization treatment was 35.0 kg/ore tonne.

As described above, in Comparative Example 2, the amount of sulfuric acid used in the leaching step and the amount of slaked lime used in the final neutralization step could be reduced, but the nickel yield was decreased.

Comparative Example 3

A nickel oxide ore having a composition presented in Table 1 was slurried and the ore slurry was supplied to the leaching step in which the leaching treatment is carried out, without carrying out the pre-treatment (the specific gravity separation and the vibration sieving treatment) on the ore slurry.

The amount of sulfuric acid consumed in the leaching treatment in the leaching step to which the ore slurry was supplied was 287 kg/ore tonne. In addition, when the sulfuration treatment was carried out on the leachate obtained through the leaching treatment (the sulfuration step) and the final neutralization treatment was carried out on the barren solution obtained by the sulfuration treatment (the final neutralization step), the amount of slaked lime used in the neutralization treatment was 47.5 kg/ore tonne.

As described above, in Comparative Example 3, the amount of sulfuric acid used in the leaching step and the amount of slaked lime used in the final neutralization step were increased, and thus it was not possible to effectively reduce the used amounts thereof.

In the following Table 2, the grades of nickel and magnesium and the content of particles having a particles diameter of less than 45 μm in the solid content, and the nickel loss rate of the ore slurry supplied to the vibration sieve and the recovery particles recovered on the sieve by the treatment using the vibration sieve in the operations of Examples 1 and 2 and Comparative Examples 1 to 3 are collectively presented.

TABLE 2

|  | Ore slurry supplied to vibration sieve | | | | Particles (on sieve) recovered by vibration sieve | | | | Ni loss rate [%] |
| --- | --- | --- | --- | --- | --- | --- | --- | --- | --- |
|  | Ni [%] | Mg [%] | Solid [t/h] | <45 μm [%] | Ni [%] | Mg [%] | Solid [t/h] | <45 μm [%] |  |
| Example 1 | 0.85 | 5.32 | 9.2 | 25.0 | 0.83 | 7.50 | 4.30 | 1.6 | 6.7 |
| Example 2 | 0.85 | 5.02 | 9.6 | 30.0 | 0.84 | 7.39 | 4.40 | 3.3 | 6.8 |
| Comparative Example 1 | 0.86 | 4.78 | 10.6 | 35.0 | 0.84 | 6.95 | 5.00 | 7.4 | 7.7 |
| Comparative Example 2 | 0.9 | 2.09 | 34.4 | 80.0 | 0.88 | 3.95 | 10.5 | 52.3 | 16.9 |
| Comparative Example 3 | — | — | — | — | — | — | — | — | 0 |

Further, in the following Table 3, the amount of sulfuric acid consumed in the leaching step and the amount of slaked lime consumed in the final neutralization step in the operations of Examples 1 and 2 and Comparative Examples 1 to 3 are collectively presented.

TABLE 3

|  | Ore slurry supplied to leaching step | | | Consumed amount of sulfuric acid [kg/Ore t] | Consumed amount of slaked lime [kg/Ore t] |
| --- | --- | --- | --- | --- | --- |
|  | Ni [%] | Mg [%] | Solid [t/h] | | |
| Example 1 | 0.91 | 1.13 | 55.7 | 272.0 | 36.0 |
| Example 2 | 0.91 | 1.13 | 55.6 | 272.0 | 36.0 |
| Comparative Example 1 | 0.91 | 1.10 | 55.0 | 271.0 | 35.5 |
| Comparative Example 2 | 0.91 | 1.08 | 49.5 | 270.0 | 35.0 |
| Comparative Example 3 | 0.91 | 1.59 | 60.0 | 287.0 | 47.5 |

The invention claimed is:

1. A method for pre-treating ore slurry to be provided to a leaching treatment in a hydrometallurgical process for nickel oxide ore, the method comprising:
    a separation step for separating ore slurry into a coarse particle fraction in which particles having a particle diameter of less than 45 μm are 30% by mass or less in a solid content and a fine particle fraction and supplying the fine particle fraction to the leaching treatment; and
    a vibration sieving step for separating, by a vibration sieve having a mesh size of 300 μm or more and 500 μm or less, the separated coarse particle fraction into a fraction on the sieve and a fraction under the sieve and supplying the fraction under the sieve as ore slurry to the leaching treatment.

2. The method for pre-treating ore slurry according to claim 1, wherein any one or more of a hydrocyclone and a density separator are used in the separation step.

3. The method for pre-treating ore slurry according to claim 2, wherein the separation step includes
    a classification and separation step for supplying the ore slurry to a hydrocyclone and subjecting the ore slurry to classification and separation, and
    a specific gravity separation step for supplying an underflow classified by the hydrocyclone in the classification and separation step to a density separator and subjecting the underflow to specific gravity separation.

4. The method for pre-treating ore slurry according to claim 1, wherein the hydrometallurgical process for nickel oxide ore includes ore slurry formation step for forming slurry of the nickel oxide ore (ore slurry), a leaching step for carrying out a leaching treatment on the ore slurry under high temperature and high pressure by adding sulfuric acid, a solid-liquid separation step for separating a residue while the obtained leached slurry is washed in multiple stages, to obtain a leachate containing nickel and impurity elements, a neutralization step for separating a neutralized precipitate containing the impurity elements by adjusting a pH of the leachate to obtain a post-neutralization solution containing nickel, a sulfuration step for carrying out a sulfuration treatment on the post-neutralization solution to generate a sulfide containing nickel and a barren solution, and a final neutralization step for recovering and detoxifying the barren solution discharged in the sulfuration step.

5. A method for manufacturing ore slurry to be provided to a leaching treatment in a hydrometallurgical process for nickel oxide ore, the method comprising:

ore slurry formation step for obtaining a coarse ore slurry from the nickel oxide ore;

a separation step for separating the coarse ore slurry into a coarse particle fraction in which particles having a particle diameter of less than 45 µm are 30% by mass or less in a solid content and a fine particle fraction;

a vibration sieving step for separating, by a vibration sieve having a mesh size of 300 µm or more and 500 µm or less, the separated coarse particle fraction into a fraction on the sieve and a fraction under the sieve; and ore slurry condensation step for loading the ore slurry of the fine particle fraction separated in the separation step and the ore slurry of the fraction under the sieve separated in the vibration sieving step into a solid-liquid separation device and separating and removing moisture contained in the ore slurry to condense ore components.

* * * * *